(12) United States Patent
Chen et al.

(10) Patent No.: US 7,686,906 B2
(45) Date of Patent: Mar. 30, 2010

(54) METHODS OF MAKING POLYMER INTERLAYERS COMPRISING POLY(CYCLOHEXANEDIMETHYLENE TEREPHTHALATE-CO-ETHYLENE TEREPHTHALATE) COPOLYESTER

(75) Inventors: Wenjie Chen, Amherst, MA (US); Witold Szydlowski, Wilbraham, MA (US); Aristotelis Karagiannis, Amherst, MA (US)

(73) Assignee: Solutia Inc., St. Louis, MO (US)

( * ) Notice: Subject to any disclaimer, the term of this patent is extended or adjusted under 35 U.S.C. 154(b) by 951 days.

(21) Appl. No.: 11/170,445

(22) Filed: Jun. 30, 2005

(65) Prior Publication Data

US 2007/0000593 A1    Jan. 4, 2007

(51) Int. Cl.
*B32B 17/00* (2006.01)
*B32B 17/10* (2006.01)
*C03C 27/00* (2006.01)
*G02C 7/00* (2006.01)

(52) U.S. Cl. .................. 156/99; 428/441; 428/442
(58) Field of Classification Search .................. 156/99; 428/441, 442
See application file for complete search history.

(56) References Cited

U.S. PATENT DOCUMENTS

| | | | |
|---|---|---|---|
| 4,373,002 A | 2/1983 | Petersen-Hoj | |
| 4,452,840 A | 6/1984 | Sato | |
| 4,465,736 A | 8/1984 | Nishihara | |
| 4,536,538 A | 8/1985 | Liu | |
| 4,559,388 A | 12/1985 | Liu | |
| 4,574,021 A * | 3/1986 | Endres et al. | 156/152 |
| 4,634,737 A | 1/1987 | Liu | |
| 4,671,913 A | 6/1987 | Gen | |
| 4,911,984 A | 3/1990 | Parker | |
| 4,973,511 A | 11/1990 | Farmer | |
| 5,091,258 A | 2/1992 | Moran | |
| 5,427,842 A | 6/1995 | Bland | |
| 5,455,103 A | 10/1995 | Hoagland | |
| 5,756,578 A * | 5/1998 | Hanes | 525/92 F |
| 6,093,471 A | 7/2000 | Hopfe | |
| 6,159,608 A * | 12/2000 | Friedman et al. | 428/442 |
| 6,451,414 B1 | 9/2002 | Wheatley | |
| 6,596,843 B2 | 7/2003 | Brunelle | |
| 6,610,409 B2 | 8/2003 | Pickett | |
| 6,664,366 B2 | 12/2003 | Silva | |
| 6,667,095 B2 | 12/2003 | Wheatley | |
| 6,689,474 B2 | 2/2004 | Pickett | |
| 6,783,349 B2 | 8/2004 | Neavin | |
| 6,788,463 B2 | 9/2004 | Merill | |
| 6,797,396 B1 | 9/2004 | Liu | |
| 6,808,658 B2 | 10/2004 | Stover | |
| 6,827,886 B2 | 12/2004 | Neavin | |
| 6,830,713 B2 | 12/2004 | Hebrink | |

(Continued)

FOREIGN PATENT DOCUMENTS

EP    91870026.1    8/1991

(Continued)

*Primary Examiner*—Philip C Tucker
*Assistant Examiner*—Michael N Orlando
(74) *Attorney, Agent, or Firm*—Hamilton, Brook, Smith & Reynolds, P.C.

(57) ABSTRACT

The present invention is in the field of polymer interlayers used in multiple layer glass panels having one or more glass layers, and specifically the present invention is in the field of polymer interlayers comprising a layer of poly(cyclohexanedimethylene terephthalate-co-ethylene terephthalate) copolyester (PETG).

24 Claims, 2 Drawing Sheets

U.S. PATENT DOCUMENTS

| | | |
|---|---|---|
| 6,844,047 B2 | 1/2005 | Kaminsky |
| 2003/0012904 A1 | 1/2003 | Hutchinson |
| 2003/0144469 A1 | 7/2003 | Kauffman |
| 2003/0211347 A1* | 11/2003 | Rabinovitch et al. ........ 428/483 |
| 2004/0004778 A1 | 1/2004 | Liu |
| 2004/0135742 A1 | 7/2004 | Weber |
| 2004/0247879 A1 | 12/2004 | Osada |
| 2005/0019530 A1 | 1/2005 | Merill |

FOREIGN PATENT DOCUMENTS

| | | |
|---|---|---|
| EP | 0 918 064 A2 | 5/1999 |
| WO | WO 97/22474 | 6/1997 |

* cited by examiner

METHODS OF MAKING POLYMER INTERLAYERS COMPRISING POLY(CYCLOHEXANEDIMETHYLENE TEREPHTHALATE-CO-ETHYLENE TEREPHTHALATE) COPOLYESTER

FIELD OF THE INVENTION

The present invention is in the field of polymer interlayers used in multiple layer glass panels having one or more glass layers, and specifically the present invention is in the field of polymer interlayers comprising a layer of poly(cyclohexanedimethylene terephthalate-co-ethylene terephthalate) copolyester (PETG).

BACKGROUND

Polymer sheets that can be used as interlayers in light-transmitting, multiple layer laminates, such as safety glass or polymeric laminates, typically comprise poly(vinyl butyral). Safety glass generally refers to a transparent laminate comprising a poly(vinyl butyral) sheet disposed between two panes of glass. Safety glass often is used to provide a transparent or decorative barrier in architectural and automotive openings. Its main function is to absorb energy, such as that caused by a blow from an object, without allowing penetration through the opening.

Although poly(vinyl butyral) is well suited in general for use as a polymer sheet in safety glass interlayers, alternative materials are often useful as well. For example, poly(ethylene-co-vinyl acetate) (EVA) and polyurethane have both been used as interlayers in glazing laminates. Interlayer materials are chosen for, among other reasons, improved handling, reduced cost of production, and improved performance. Alternatives to poly(vinyl butyral) interlayers could be useful, for example, if those alternatives showed improved performance below 0° C. and/or above 35° C., where standard poly(vinyl butyral) has relatively poor impact performance. Furthermore, alternatives which could provide much higher penetration resistance and stiffness to the laminated glass will be desired as well in applications requiring high security, bullet-proofing, hurricane-proofing, glazing, and so on.

Accordingly, further improved materials for use as an interlayer or part of an interlayer in multiple layer glass panels are needed in the art.

SUMMARY OF THE INVENTION

It has now been surprisingly discovered, according to the present invention, that interlayers comprising poly(cyclohexanedimethylene terephthalate-co-ethylene terephthalate) copolyester can be used to form interlayers having, relative to conventional interlayers, improved impact performance over a broader range of conditions. Further, poly(cyclohexanedimethylene terephthalate-co-ethylene terephthalate) interlayers of the present invention can be formed into thin interlayers having equivalent impact resistance to thicker, conventional interlayers.

DETAILED DESCRIPTION

Figure 1:
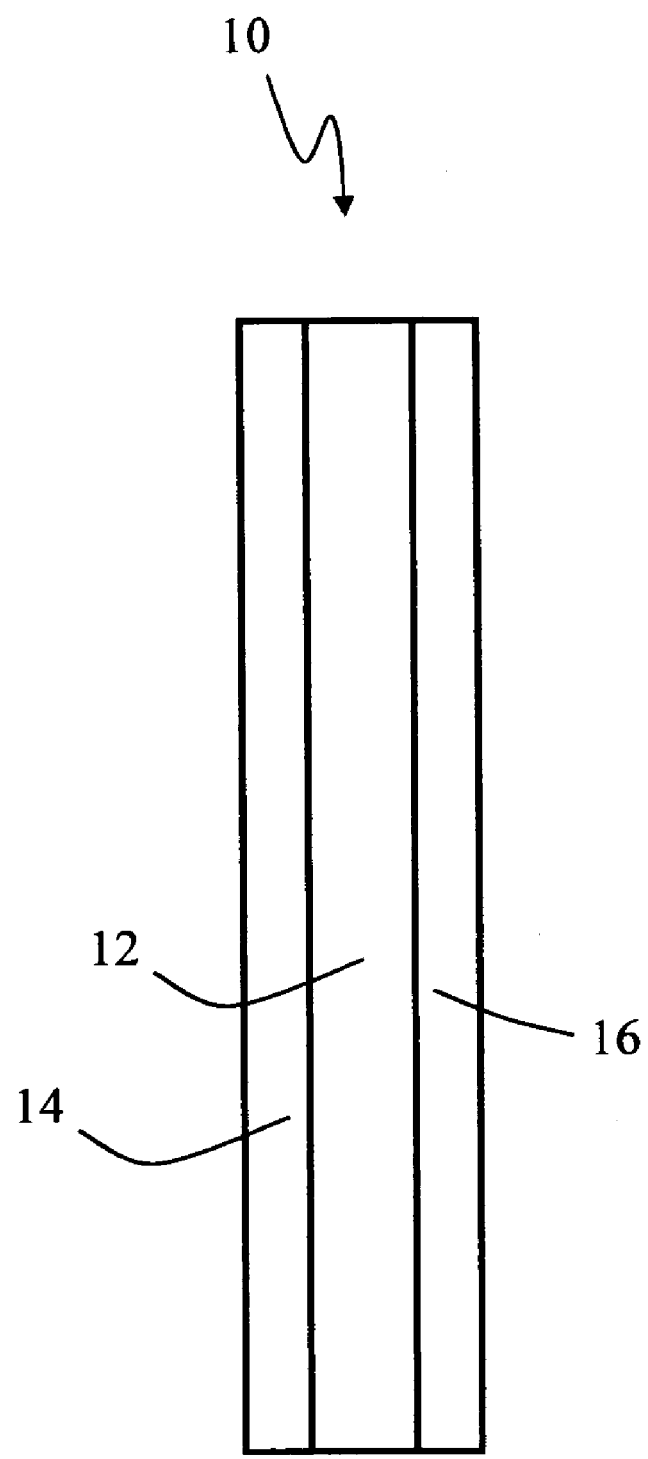
FIG. 1 represents a schematic cross sectional view of one embodiment of an interlayer of the present invention.

The present invention is directed to interlayers that can be used in multiple layer laminated glass constructs such as those used in architectural applications and automotive, train, and aircraft applications. Interlayers of the present invention incorporate one or more layers of poly(cyclohexanedimethylene terephthalate-co-ethylene terephthalate) copolyester, which, when extruded or otherwise formed into a sheet, forms an amorphous polymer layer that does not need to be biaxially stretched like poly(ethylene terephthalate) to achieve clarity, and which can be formed into a much thicker layer than poly(ethylene terephthalate) without a consequent reduction in clarity.

As used herein, poly(cyclohexanedimethylene terephthalate-co-ethylene terephthalate), or "PETG", refers to poly(1,4-cyclohexanedimethylene terephthalate-co-ethylene terephthalate) copolyester.

As is known in the art, the reaction of ethylene glycol with terephthalic acid results in poly(ethylene terephthalate). Addition of cyclohexanedimethanol, shown below, to the reaction results in poly(cyclohexanedimethylene terephthalate-co-ethylene terephthalate) copolyester. The poly(cyclohexanedimethylene terephthalate-co-ethylene terephthalate) resins are available commercially in various forms from, for example, Eastman Chemical Company (Kingsport, Tenn.) as Spectar™ or Eastar™ resin and SK Chemicals (South Korea) as SKYGREEN® resin.

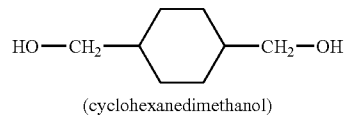

(cyclohexanedimethanol)

Poly(cyclohexanedimethylene terephthalate-co-ethylene terephthalate) copolyester compositions of the present invention comprise, on a weight per weight basis, at least 10% of the following poly(ethylene terephthalate) component:

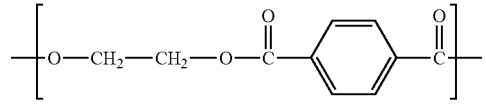

With the remainder being all, or substantially all of the following poly(1,4 cyclohexanedimethylene terephthalate) component:

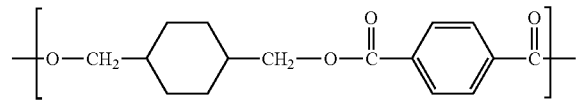

In various embodiments of the present invention, a polymer sheet comprising poly(cyclohexanedimethylene terephthalate-co-ethylene terephthalate) copolyester comprises at least 10%, 20%, 30%, 40%, 50%, 60%, 70%, 80%, or 90% of the poly(ethylene terephthalate) component, with an upper maximum of no more than 90%, 95%, and, in some embodiments, no more than 99% of the poly(ethylene terephthalate) component.

In various embodiments of the present invention, a polymer sheet comprising poly(cyclohexanedimethylene terephthalate-co-ethylene terephthalate) copolyester can comprise as an optional component isomers of terephthalic acid, such as isophthalic acid, which can be added to the reaction mixture.

In various embodiments of the present invention, an interlayer consists essentially of a polymer sheet comprising poly(cyclohexanedimethylene terephthalate-co-ethylene terephthalate) copolyester. In various embodiments, the poly(cyclohexanedimethylene terephthalate-co-ethylene terephthalate) copolyester polymer sheet has a thickness of at least 0.02 millimeters, 0.035, millimeters, 0.05 millimeters, 0.1 millimeters, 0.2 millimeters, 0.5 millimeters, 1.0 millimeters, 5.0 millimeters, 10 millimeters, 15 millimeters, or at least 20 millimeters. In these embodiments, adhesion promoters can be included in or sprayed on the poly(cyclohexanedimethylene terephthalate-co-ethylene terephthalate) polymer sheet to promote adhesion to glass. The multiple layer structure consists essentially of the poly(cyclohexanedimethylene terephthalate-co-ethylene terephthalate) interlayer disposed between two layers of glass.

Adhesion promoters that are useful with poly(cyclohexanedimethylene terephthalate-co-ethylene terephthalate) interlayers of the present invention include silane coupling agents, such as, γ-glycidoxypropyltrimethoxysilane, γ-aminopropyltriethoxysilane, β-cyclohexylethyltrimethoxysilane, N-β-aminoethylaminomethylphenylethyltrimethoxysilane, N-β-aminoethyl-γ-aminopropyltrimethoxysilane, bis(β-hydroxyethyl)-γ-aminopropyltriethoxysilane, and the like; acrylic adhesives; cyanoacrylates cement; polyurethanes adhesives; polyester adhesives; and the like.

In various embodiments of the present invention, an interlayer comprises a polymer sheet comprising poly(cyclohexanedimethylene terephthalate-co-ethylene terephthalate) copolyester, wherein the polymer sheet comprising poly(cyclohexanedimethylene terephthalate-co-ethylene terephthalate) copolyester has a thickness of at least 0.25 millimeters, 0.3 millimeters, 0.5 millimeters, 1.0 millimeters, 5.0 millimeters, 10 millimeters, 15 millimeters, or at least 20 millimeters.

In various embodiments of interlayers of the present invention comprising a polymer sheet comprising poly(cyclohexanedimethylene terephthalate-co-ethylene terephthalate), the polymer sheet comprising poly(cyclohexanedimethylene terephthalate-co-ethylene terephthalate) is incorporated into the interlayer between two layers of other polymeric material, resulting in a multiple layer interlayer. As shown in FIG. 1 generally at 10, interlayers of these embodiments comprise a poly(cyclohexanedimethylene terephthalate-co-ethylene terephthalate) first polymer sheet 12 disposed between a second polymer sheet 14 and a third polymer sheet 16. As will be described in detail below, the second polymer sheet 14 and third polymer sheet 16 can comprise any suitable polymer, for example, poly(vinyl butyral), poly(vinyl chloride), poly(ethylene-co-vinyl acetate), poly(ethylene-co-ethyl acrylate), ionomers of partially neutralized ethylene/(meth)acrylic acid copolymer (such as Surlyn® from DuPont), polyethylene, polyethylene copolymers, polyurethane, or any other polymeric material with sufficient adhesion to glass and poly(cyclohexanedimethylene terephthalate-co-ethylene terephthalate) copolyester. The second polymer sheet 14 and the third polymer sheet 16 can comprise the same polymer sheet material or different materials, and can have the same thickness or different thicknesses. Overall thickness of three layer embodiments can be, for example, from 0.27 millimeters and thicker, where the second polymer sheet and third polymer sheet are at least 0.01 millimeters thick.

Figure 2:
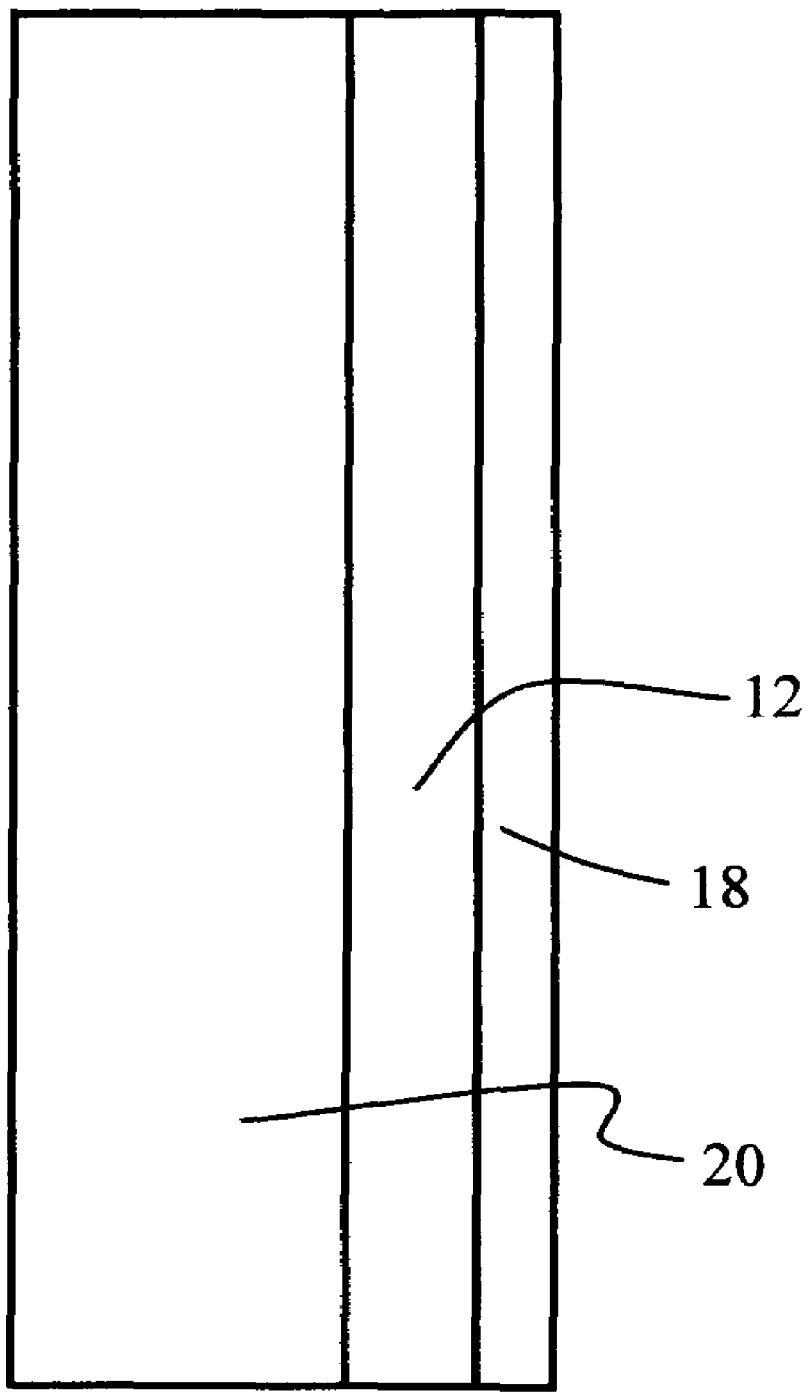
FIG. 2 represents a schematic cross sectional view of one embodiment of a bilayer of the present invention.

In further embodiments, as shown in FIG. 2, which is known as a bilayer, a poly(cyclohexanedimethylene terephthalate-co-ethylene terephthalate) first polymer sheet 12 is disposed between a second polymer sheet 18 and a rigid substrate 20, which can be glass or another rigid glazing substrate, such as plastic having a high glass transition temperature. In these bilayer embodiments, the poly(cyclohexanedimethylene terephthalate-co-ethylene terephthalate) first polymer sheet and the second polymer sheet can have any of the compositions and characteristics given above for the corresponding layers shown in FIG. 1. Additionally, the poly(cyclohexanedimethylene terephthalate-co-ethylene terephthalate) first polymer sheet 12 can optionally include any of the adhesion promoters given elsewhere herein. As used herein, an "interlayer" includes the one or more layers that form the polymeric component of bilayers—for example, layers 12 and 18 in FIG. 2.

In alternative embodiments, the poly(cyclohexanedimethylene terephthalate-co-ethylene terephthalate) copolyester first polymer sheet 12 and second polymer sheet 18 can be reversed to produce a bilayer having the construct: rigid substrate//polymer sheet//PETG polymer sheet. In these embodiments, the poly(cyclohexanedimethylene terephthalate-co-ethylene terephthalate) copolyester polymer sheet can have a thickness of at least of at least 0.25 millimeters, 0.3 millimeters, 0.5 millimeters, 1.0 millimeters, 5.0 millimeters, 10 millimeters, 15 millimeters, or at least 20 millimeters.

Overall thickness of bilayer embodiments can be, for example, from 0.26 millimeters and thicker.

In addition to the layers described above and shown in the FIGS. 1 and 2, additional layers can also be incorporated, as are known in the art. For example, a performance enhancing polymer film layer comprising poly(ethylene terephthalate) can be included, where appropriate. Further polymer sheet layers can also be included. One exemplary interlayer embodiment has the following structure: polymer sheet//polymer film//polymer sheet//PETG polymer sheet//polymer sheet. Other variations are, of course, possible and within the scope of the present invention.

The embodiments described above and shown in FIGS. 1 and 2 include interlayers that are formed by laminating multiple individual polymer layers together into a single, multiple layer interlayer, as well as other methods of producing interlayers within the scope of the present invention, such as coextrusion and extrusion coating. Either of these extrusion methods can be used to produce a multiple layer interlayer comprising polymer sheets or polymer films.

Various embodiments of the present invention include multiple poly(cyclohexanedimethylene terephthalate-co-ethylene terephthalate) polymer sheets. For example and without limitation, embodiments of the present invention include laminated constructs such as:

PETG polymer sheet//PETG polymer sheet;

PETG polymer sheet//polymer sheet//PETG polymer sheet; and,

Polymer sheet//PETG polymer sheet//PETG polymer sheet//polymer sheet.

Many other variations will be readily apparent to those of skill in the art, and are within the scope of the present invention.

Polymer Sheet

As used herein, a "polymer sheet" means any thermoplastic polymer composition formed by any suitable method into a thin layer for use in combination with a layer of poly(cyclohexanedimethylene terephthalate-co-ethylene terephthalate) to form an interlayer that provides adequate penetration and glass retention properties to laminated glazing panels. The polymer sheet could be preformed into the sheet and then laminated with poly(cyclohexanedimethylene terephthalate-co-ethylene terephthalate) to form an interlayer comprising poly(cyclohexanedimethylene terephthalate-co-ethylene terephthalate).

Plasticized poly(vinyl butyral) is most commonly used to form polymer sheets. As described in this section, "polymer sheets" specifically do not include poly(cyclohexanedimethylene terephthalate-co-ethylene terephthalate) polymer sheets, which are described above.

The following section describes the various materials that can be used to form polymer sheets of the present invention, for example those sheets shown as elements 14 and 16 in FIG. 1.

In various embodiments of the present invention, polymer sheets can be between 0.01 and 4.0 millimeters, 0.1 to 2.0 millimeters, 0.25 to 1.0 millimeters, or 0.3 to 0.7 millimeters in thickness. In other applications, thickness can be about 1 to 2 centimeters or thicker. In certain security applications, thickness can significantly increase, and multiple layers of thin polymer sheets, for example 30, 40, or 50 polymer sheets, can be laminated together to form a single very thick layer.

The polymer sheets of the present invention can comprise any suitable polymer, and, in a one embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In further embodiments the polymer sheet comprises poly(vinyl butyral) and one or more other polymers. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by any suitable method. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, 3$^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.)

In various embodiments, the resin used to form polymer sheet comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer sheet comprises poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/m (see, for example, U.S. Pat. Nos. 4,902,464; 4,874,814; 4,814,529; 4,654,179). As used herein, the term "molecular weight" means the weight average molecular weight.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate) (chemical abstracts number 79992-76-0). In various embodiments of the present invention the magnesium salt is magnesium bis(2-ethyl butyrate).

Additives may be incorporated into the polymer sheet to enhance its performance in a final product. Such additives include, but are not limited to, the following agents: antiblocking agents, plasticizers, dyes, pigments, stabilizers (e.g., ultraviolet stabilizers), antioxidants, flame retardants, IR absorbers, and combinations of the foregoing additives, and the like, as are known in the art.

In various embodiments of polymer sheets of the present invention, the polymer sheets can comprise 5 to 60, 25 to 60, 5 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of, for example, 40° C. or less, 35° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2 ethylhexanoate.

In various other embodiments of the present invention, polymer sheets comprise a polymer selected from the group consisting of poly(vinyl butyral), polyurethane, polyvinyl chloride, poly(ethylene-co-vinyl acetate), polyethylene, polyethylene copolymers, partially neutralized ethylene/(meth)acrylic copolymers, combinations thereof, and the like. Any other polymeric material with sufficient adhesion to glass and poly(cyclohexanedimethylene terephthalate-co-ethylene terephthalate) copolyester can be used.

Various embodiments include poly(ethylene-co-vinyl acetate) as describe in U.S. Pat. No. 4,614,781, U.S. Pat. No. 5,415,909, U.S. Pat. No. 5,352,530, and U.S. Pat. No. 4,935,470. Various embodiments include polyurethane comprising, for example, aliphatic isocyanate polyether based polyurethane (available from Thermedics Polymer Products of Noveon Inc.). Other additives can be incorporated into the polyurethane resins during extrusion, such as UV stabilizers and functional chemicals to provide high adhesion to glass.

Polymeric resins can be thermally processed and configured into sheet form according to methods known to those of ordinary skill in the art. As used herein, "resin" refers to the polymeric (for example poly(vinyl butyral) or poly(vinyl chloride)) component of a polymer composition. Resin will generally have other components in addition to the polymer, for example, components remaining from the polymerization process. As used herein, "melt" refers to a melted mixture of resin with a plasticizer, if required, and optionally other additives, for example, performance enhancing agents.

One exemplary method of forming a poly(vinyl butyral) sheet comprises extruding molten poly(vinyl butyral) comprising resin, plasticizer, and additives—the melt—by forcing the melt through a sheet die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet.

Methods of the present invention include coextruding polyurethane and poly(cyclohexanedimethylene terephthalate-co-ethylene terephthalate) copolyester to form a two, three, or greater layer interlayer. For example, a polyurethane melt and a poly(cyclohexanedimethylene terephthalate-co-ethylene terephthalate) copolyester melt can be coextruded to form a two layer, bilayer embodiment, or a three layer, encapsulated poly(cyclohexanedimethylene terephthalate-co-ethylene terephthalate) copolyester embodiment. For these embodiments, any of the variations given herein throughout for a poly(cyclohexanedimethylene terephthalate-co-ethylene terephthalate) copolyester polymer sheet and a non-poly(cyclohexanedimethylene terephthalate-co-ethylene terephthalate) copolyester polymer sheet can be used, where applicable. In one exemplary method of forming a PU/PETG/PU interlayer by coextrusion, where PU is polyurethane, polyurethane resin, including additives, and poly(cyclohexanedimethylene terephthalate-co-ethylene terephthalate) resin, including additives, are fed into two single-screw extruder separately. Extruder temperatures are set appropriately, for example, for polyurethane at, for example, 150° C.-225° C. or 160° C.-180° C., and for poly(cyclohexanedimethylene terephthalate-co-ethylene terephthalate) at, for example, 200° C.-290° C. or 240° C.-260° C. C. The two resins are heated to form melts, which are pumped separately into two outer-layer channels and a inner-layer channel of a three-manifold coextrusion die. The melts are then forced through a die-lip to form an interlayer having a poly(cyclohexanedimethylene terephthalate-co-ethylene terephthalate) copolyester polymer sheet disposed between two polyurethane polymer sheets. In any of these embodiments, layer thicknesses can be the same as given elsewhere herein for non-extruded embodiments.

In another exemplary method of forming poly(ethylene-co-vinyl acetate)/PETG/poly(ethylene-co-vinyl acetate) interlayers by coextrusion, EVA resin, including additives, and poly(cyclohexanedimethylene terephthalate-co-ethylene terephthalate) resin, including additives, are fed into two single-screw extruders separately, with the extruder temperature for EVA at, for example, 90° C.-200° C. or 90° C.-110° C., and for poly(cyclohexanedimethylene terephthalate-co-ethylene terephthalate) at, for example, 200° C.-290° C. or 240° C.-260° C. The two melts are pumped separately into the two outer-layer channels and one inner-layer channel of a three-manifold coextrusion die, and then forced through a die-lip to form a three-layer multilayer interlayer, which can be cooled down, for example, through a water bath or a chilling-roll and then wound into a roll.

In coextrusion embodiments and extrusion coating embodiments, the outside surfaces of the multiple layer interlayers can be treated to create surface texture, or roughness, to facilitate deairing during the lamination procedure. Such surface texturing, which can be accomplished, for example, with melt fracture or embossing, is well known in the art.

As used herein, "extrusion temperature" means average melt temperature integrated across the cross section of flow.

Polymer Film

As used herein, a "polymer film" means a relatively thin and rigid polymer layer that functions as a performance enhancing layer. Polymer films differ from polymer sheets, as used herein, because polymer films do not themselves provide the necessary impact resistance and glass retention properties to a multiple layer glazing structure, but rather provide performance improvements, such as infrared absorption character. Poly(ethylene terephthalate) is most commonly used as a polymer film.

Polymer films used in the present invention can be any suitable film that is sufficiently rigid to provide a relatively flat, stable surface, for example those polymer films conventionally used as a performance enhancing layer in multiple layer glass panels. The polymer film is preferably optically transparent (i.e. objects adjacent one side of the layer can be comfortably seen by the eye of a particular observer looking through the layer from the other side), and usually has a greater, in some embodiments significantly greater, tensile modulus regardless of composition than that of the adjacent polymer sheet. In various embodiments, the polymer film comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film comprises materials such as re-stretched thermoplastic films having the noted properties, which include polyesters. In various embodiments, the polymer film comprises or consists of poly(ethylene terephthalate), and, in various embodiments, the poly(ethylene terephthalate) has been biaxially stretched to improve strength, and/or has been heat stabilized to provide low shrinkage characteristics when subjected to elevated temperatures (e.g. less than 2% shrinkage in both directions after 30 minutes at 150° C.).

In various embodiments, the polymer film can have a thickness of 0.013 millimeters to 0.25 millimeters, 0.025 millimeters to 0.1 millimeters, or 0.04 to 0.06 millimeters. The polymer film can optionally be surface treated or coated with a functional performance layer to improve one or more properties, such as adhesion or infrared radiation reflection. These functional performance layers include, for example, a multilayer stack for reflecting infra-red solar radiation and transmitting visible light when exposed to sunlight. This multilayer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known (see, for example, U.S. Pat. Nos. 4,017,661 and 4,786,783), the metal layer(s) may optionally be electrically resistance heated for defrosting or defogging of any associated glass layers. Various coating and surface treatment techniques for poly(ethylene terephthalate) film and other polymer films that can be used with the present invention are disclosed in published European Application No. 0157030. Polymer films of the present invention can also include a hardcoat and/or and antifog layer, as are known in the art.

In various embodiments of the present invention, poly(cyclohexanedimethylene terephthalate-co-ethylene terephthalate) copolyester polymer sheet and/or polymer film layers such as poly(ethylene terephthalate) can be directly printed with dyes, inks, pigments, and the like to impart a pattern or other optical effect upon the finished product.

The present invention includes multiple layer glass panels comprising any interlayers of the present invention.

The present invention includes methods of making interlayers and multiple layer glass panels comprising forming any of the interlayers and glass panels of the present invention by the methods described herein.

The present invention includes multiple layer glazing panels, and specifically multiple layer glass panels such as architectural safety glass and automobile windshields, comprising any of the interlayers of the present invention.

The present invention includes methods of manufacturing a multiple layer glass panel, comprising disposing any of the interlayers of the present invention, with or without additional polymeric layers, between two panes of glass and laminating the stack.

The present invention includes methods of securing an enclosed space, comprising disposing in one or more openings that provide access to said space a multiple layer glass panel of the present invention.

Also included in the present invention are stacks or rolls of any of the polymer interlayers of the present invention disclosed herein.

In addition to the embodiments given above, other embodiments comprise a rigid glazing substrate other than glass. In these embodiments, the rigid substrate can comprise acrylic such as Plexiglass®, polycarbonate such as Lexan®, and other plastics, that are conventionally used as glazings.

Various polymer sheet and/or laminated glass characteristics and measuring techniques will now be described for use with the present invention.

The clarity of a polymer sheet, can be determined by measuring the haze value, which is a quantification of the scattered light by a sample in contrast to the incident light. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17.8° C. (0° F.) and manually pummeled with a hammer to break the glass. All broken glass that is not adhered to the polymer sheet is then removed, and the amount of glass left adhered to the polymer sheet is visually compared with a set of standards. The standards correspond to a scale in which varying degrees of glass remain adhered to the poly(vinyl butyral) sheet. In particular, at a pummel standard of zero, no glass is left adhered to the polymer sheet. At a pummel standard of 10, 100% of the glass remains adhered to the polymer sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness. In various embodiments of the present invention, a polymer sheet can have a yellowness index of 12 or less, 10 or less, or 8 or less.

EXAMPLE 1

A 0.76 millimeter layer of poly(cyclohexanedimethylene terephthalate-co-ethylene terephthalate) is disposed between two sheets of 0.38 millimeter thick poly(ethylene-co-vinyl acetate) (available from Bridgestone Corporation, Tokyo, Japan as EVASAFE™) to form an interlayer, which is disposed between two sheets of 2 millimeter thick glass. The resulting multiple layer glass panel has a haze value of 0.7%, pummel of 9, and no breakthrough when a 2.27 kilogram steel ball is dropped from a height of 10.7 meters at any of the following temperatures: −17.8° C., 21.1° C., and 48.9° C.

EXAMPLE 2 (COMPARATIVE TO EXAMPLE 1)

A 0.18 millimeter layer of biaxially stretched poly(ethylene terephthalate) is disposed between two sheets of 0.89 millimeter thick poly(vinyl butyral) containing 30 phr triethylene glycol di-(2-ethylhexanoate) to form an interlayer, which is disposed between two sheets of 2 millimeter thick glass. The resulting multiple layer glass panel has a haze value of 0.8%, pummel of 9, and a mean break height of 2.9 meters with a 2.27 kilogram steel ball at −17.8° C. and no breakthrough with that same ball at 10.7 meters at any of the following temperatures: 21.1° C., and 48.9° C.

EXAMPLE 3

A 0.5 millimeter layer of poly(cyclohexanedimethylene terephthalate-co-ethylene terephthalate) is disposed between two sheets of 0.25 millimeter thick polyurethane (available from Argotec, Inc. Greenfield, Mass. as Argotec PE-399) to form an interlayer, which is disposed between two sheets of 2 millimeter thick glass. The resulting multiple layer glass panel has a haze value of 0.7%, pummel of 9, and a mean break height of 10.7 meters with a 2.27 kilogram steel ball at 21.1° C.

EXAMPLE 4 (COMPARATIVE TO EXAMPLE 3)

Four sheets of 0.25 millimeter thick polyurethane (available from Argotec, Inc. Greenfield, Mass. as Argotec PE-399) are assembled together to form a 1 millimeter polyurethane interlayer, which is disposed between two sheets of 2 millimeter thick glass. The resulting multiple layer glass panel has a haze value of 0.7%, pummel of 9, and a mean break height of 7 meters with a 2.27 kilogram steel ball at 21.1° C.

By virtue of the present invention, it is now possible to provide interlayers comprising poly(cyclohexanedimethylene terephthalate-co-ethylene terephthalate), which allows the formation of relatively stronger layers having superior clarity and favorable processing characteristics. Poly(cyclohexanedimethylene terephthalate-co-ethylene terephthalate) copolyester interlayers of the present invention can be readily shaped, which is particularly advantageous for applications such as automobile windshields, which can have significant curvature in three dimensions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising poly(cyclohexanedimethylene terephthalate-co-ethylene terephthalate) in any of the ranges given in addition to any of the ranges given for an adhesion promoter, to form many permutations that are within the scope of the present invention.

Figures are understood to not be drawn to scale unless indicated otherwise.

Each reference, including journal articles, patents, applications, and books, referred to herein is hereby incorporated by reference in its entirety.

We claim:

1. A method of manufacturing a multiple layer glazing panel interlayer, comprising:
   forming a first melt comprising poly(cyclohexanedimethylene terephthalate-co-ethylene terephthalate) copolyester;
   forming a second melt comprising polyurethane or poly(ethylene-co-vinyl acetate); and,
   coextruding said first melt and said second melt to form said interlayer.

2. The method of claim 1, wherein said second melt comprises poly(ethylene-co-vinyl acetate).

3. The method of claim 2, wherein said poly(ethylene-co-vinyl acetate) is extruded at a temperature of 90° C. to 200° C. and said poly(cyclohexanedimethylene terephthalate-co-ethylene terephthalate) copolyester is extruded at a temperature of 200° C. to 290° C.

4. The method of claim 2, wherein said first melt is used to form a single layer and said second melt is used to form a single layer, thereby resulting in said interlayer having two layers.

5. The method of claim 2, wherein said first melt is used to form a single layer and said second melt is used to form two layers, thereby resulting in said interlayer having a single layer of polymer comprising poly(cyclohexanedimethylene terephthalate-co-ethylene terephthalate) copolyester disposed between two layers of polymer comprising poly(ethylene-co-vinyl acetate).

6. The method of claim 1, wherein said second melt comprises polyurethane.

7. The method of claim 6, wherein said polyurethane is extruded at a temperature of 150° C. to 225° C. and said poly(cyclohexanedimethylene terephthalate-co-ethylene terephthalate) copolyester is extruded at a temperature of 200° C. to 290° C.

8. The method of claim 6, wherein said first melt is used to form a single layer and said second melt is used to form a single layer, thereby resulting in said interlayer having two layers.

9. The method of claim 6, wherein said first melt is used to form a single layer and said second melt is used to form two layers, thereby resulting in said interlayer having a single layer of polymer comprising poly(cyclohexanedimethylene terephthalate-co-ethylene terephthalate) copolyester disposed between two layers of polymer comprising polyurethane.

10. The method of claim 1, wherein said first polymer melt comprises poly(cyclohexanedimethylene terephthalate-co-ethylene terephthalate) copolyester having at least 10% poly(ethylene terephthalate) component by weight.

11. The method of claim 1, wherein said first polymer melt comprises poly(cyclohexanedimethylene terephthalate-co-ethylene terephthalate) copolyester having at least 40% poly(ethylene terephthalate) component by weight.

12. A method of manufacturing a multiple layer glazing panel, comprising:
   forming a first melt comprising poly(cyclohexanedimethylene terephthalate-co-ethylene terephthalate) copolyester;
   forming a second melt comprising polyurethane or poly(ethylene-co-vinyl acetate);
   coextruding said first melt and said second melt to form an interlayer; and,
   laminating said interlayer with at least one layer of glass to form said glazing panel.

13. The method of claim 12, wherein said second melt comprises poly(ethylene-co-vinyl acetate).

14. The method of claim 13, wherein said poly(ethylene-co-vinyl acetate) is extruded at a temperature of 90° C. to 200° C. and said poly(cyclohexanedimethylene terephthalate-co-ethylene terephthalate) copolyester is extruded at a temperature of 200° C. to 290° C.

15. The method of claim 13, wherein said first melt is used to form a single layer and said second melt is used to form a single layer, thereby resulting in said interlayer having two layers.

16. The method of claim 13, wherein said first melt is used to form a single layer and said second melt is used to form two layers, thereby resulting in said interlayer having a single layer of polymer comprising poly(cyclohexanedimethylene terephthalate-co-ethylene terephthalate) copolyester disposed between two layers of polymer comprising poly(ethylene-co-vinyl acetate).

17. The method of claim 12, wherein said second melt comprises polyurethane.

18. The method of claim 17, wherein said polyurethane is extruded at a temperature of 150° C. to 225° C. and said poly(cyclohexanedimethylene terephthalate-co-ethylene terephthalate) copolyester is extruded at a temperature of 200° C. to 290° C.

19. The method of claim 17, wherein said first melt is used to form a single layer and said second melt is used to form a single layer, thereby resulting in said interlayer having two layers.

20. The method of claim 17, wherein said first melt is used to form a single layer and said second melt is used to form two layers, thereby resulting in said interlayer having a single layer of polymer comprising poly(cyclohexanedimethylene terephthalate-co-ethylene terephthalate) copolyester disposed between two layers of polymer comprising polyurethane.

21. The method of claim 12, wherein said first polymer melt comprises poly(cyclohexanedimethylene terephthalate-co-ethylene terephthalate) copolyester having at least 10% poly(ethylene terephthalate) component by weight.

22. The method of claim 12, wherein said first polymer melt comprises poly(cyclohexanedimethylene terephthalate-co-ethylene terephthalate) copolyester having at least 40% poly(ethylene terephthalate) component by weight.

23. The method of claim 12, wherein said interlayer is laminated between two layers of glass to form said glazing panel.

24. A multiple layer glazing panel interlayer produced by the process comprising:
    forming a first melt comprising poly(cyclohexanedimethylene terephthalate-co-ethylene terephthalate) copolyester;
    forming a second melt comprising polyurethane or poly(ethylene-co-vinyl acetate); and,
    coextruding said first melt and said second melt to form said interlayer.

* * * * *